United States Patent Office 3,342,595
Patented Sept. 19, 1967

3,342,595
NON-SILVER PHOTOSENSITIVE PRINTOUT COMPOSITIONS
Robert H. Sprague, Chagrin Falls, and Juergen H. Keller, Brookpark, Ohio, assignors to Horizons Incorporated, a corporation of New Jersey
No Drawing. Filed Sept. 11, 1964, Ser. No. 395,903
11 Claims. (Cl. 96—48)

ABSTRACT OF THE DISCLOSURE

Non-silver photosensitive compositions which print out a visible image directly as a result of exposure to visible light. The compositions contain at least one colorless leuco dihydroanthracene and one or more colorless compounds which cause the color forming reaction to take place at practical speeds, said colorless compounds being one or more of either an organic halogen compound or an organic sulfur compound, or both.

This invention relates to non-silver photosensitive compositions which print-out an image directly upon exposure to a suitable dosage of visible light, and to the use of such compositions as thin films in photographic processes. More particularly this invention relates to photosensitive compositions comprising at least one colorless leuco compound which when intimately admixed with one or more colorless activator compounds, yields a mixture which when exposed to visible light will print out a visible image directly at speeds which are of practical significance, and to the processing of such compositions to yield a permanent useful image.

1. THE LEUCO COMPOUNDS

The leuco compounds which have been found useful in the practice of the present invention are leucodihydroanthracenes represented by the general formula

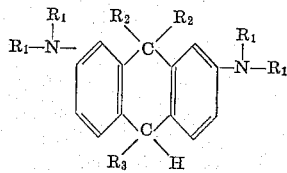

wherein each $R_1$ is a monovalent radical selected from the group consisting of —H, lower alkyl, aryl, and the several $R_1$'s may be the same or different and $R_2$ is a monovalent radical selected from the group consisting of H and alkyl and $R_3$ is a monovalent radical selected from the group consisting of aryl, including substituted aryl, particularly

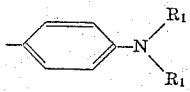

wherein $R_1$ has the same meaning as above, alkyl and H.
Specific leuco dihydroanthracenes which are particularly preferred include the following:

2,7-bis(dimethylamino)-10-p-dimethylaminophenyl-9,10-dihydro-9,9-dimethylanthracene
2,7-bis(dimethylamino)-9,10-dihydro-9,9-dimethyl anthracene 2,7-bis(dimethylamino)-10-ethyl-9,10-dihydro-9,9-dimethyl anthracene

2. THE ACTIVATORS

Any of the activators disclosed in pending United States Patent application Ser. No. 270,551, filed Apr. 4, 1963 which issued as United States Patent 3,285,744 on Nov. 15, 1966 may be used in combination with the above described leucodihydroanthracene compounds, a particularly preferred group being those identified by the general formula R—SH wherein the mercapto group is attached to a ring carbon of a heterocyclic nucleus of the type commonly used in cyanine dye chemistry such as those listed in column 1 of United States Patent 3,104,973 issued Sept. 24, 1963.

These activators are colorless non-toxic sulfur-containing organic compounds selected from the group consisting of (1) Mercapto compound of the type R—S—H wherein R is a heterocyclic nucleus of the type commonly used in cyanine dye chemistry;
(2) Disulfides of the type R—S—S—R wherein R has the same meaning as in 1 above;
(3) Disulfides of the general formula

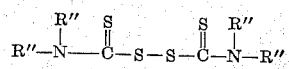

wherein R″ is selected from the group consisting of H, lower alkyl and aryl;
(4) Cyclic sulfur compounds wherein the sulphur is attached to a carbon atom in a heterocyclic ring wherein the same carbon atom is attached to two non-carbon atoms (e.g. as in rhodanine or tetrazole);
(5) Thiourea and substituted thioureas; and
(6) Acyclic thioacetanilides.

Another group of compounds which is very effective as an activator are the organic bromine compounds represented by the general formula A—C—Br₃ wherein A represents a monovalent radical selected from the group consisting of H, Cl, Br, alkyl, haloalkyl, aryl and aroyl.

In order to determine the effect of visible light upon mixtures of various activators and the leucodihydroanthracenes listed above the following procedure was followed.

A mixture was prepared consisting of equal parts by volume of acetone and a 10% solution of polystyrene in benzene, 2 cc. of each being used in most instances. Then the indicated weights of the leuco compound and of the activator were dissolved in the mixture. The resulting composition formed from originally colorless materials had a cloudy or hazy appearance or a faint bluish color in most instances. The composition was coated by means of a Bird applicator on 500-D Mylar in a coating having an 0.0015 wet inch thickness and the coating was permitted to dry in air. Thereafter the composition was exposed either to a photoflood lamp through a step tablet or on a Eastman Kodak Sensitometer with a suitable filter.

The composition was exposed to a General Electric 500 watt RFL2 Photoflood Lamp through a #2 silver step wedge for a 1 minute interval at a distance of 12 inches from lamp to test material. The density and number of steps visible in the image were read, after fixing the image by solvent wash or by heat.

In the table which follows the anthracene compound for Formulas 1, 2 and 3 is (A) 2,7-bis(dimethylamino)-10-p-dimethyl-aminophenyl - 9,10 - dihydro-9,9-dimethyl-anthracene; the anthracene compound for Formulas 4, 5, and 6 is (B) 2,7-bis(dimethylamino)-9,10-dihydro-9,9-dimethylanthracene; and the anthracene compound for Formulas 7, 8 and 9 is (C) 2,7-bis(dimethylamino)-10-ethyl-9,10-dihydro-9,9-dimethylanthracene.

TABLE I

| Formula No. | Leuco Compound, mg. | Activator, mg. CBr₄ | Activator, mg. 2-MBT | Wet Coating Thickness (Inch) | Binder | Base plus Fog | Clear No. D. Steps | Clear No. D. Max. | Red No. D. Steps | Red No. D. Max. | Green No. D. Steps | Green No. D. Max. | Blue No. D. Steps | Blue No. D. Max. | Image Color |
|---|---|---|---|---|---|---|---|---|---|---|---|---|---|---|---|
| 1 | A 100 | | 100 | 0.0015 | PS | 0.23 | 21 | 1.22 | 21 | 1.09 | 16 | 0.77 | 10 | 0.54 | Blue. |
| 2 | A 100 | 700 | | 0.003 | CAB | 0.55 | 21 | 3+ | 18 | 2.96 | 14 | 2.36 | 14 | 2.16 | Do. |
| 3 | A 100 | 700 | 25 | 0.003 | CAB | 0.09 | 21 | 2.44 | 17 | 1.05 | 11 | 0.76 | 11 | 0.49 | Do. |
| 4 | B 100 | | 100 | 0.0015 | PS | 0.10 | Image removed in solvent rinse | | | | | | | | Do. |
| 5 | B 25 | 700 | | 0.0015 | PS | 0.16 | 18 | 0.86 | 14 | 0.67 | 7 | 0.45 | 9 | 0.36 | Do. |
| 6 | B 100 | 700 | 25 | 0.003 | CAB | 0.06 | 21 | 1.04 | 17 | 1.04 | 11 | 1.04 | 15 | 1.49 | Do. |
| 7 | C 100 | | 100 | 0.0015 | PS | 0.09 | 21 | 0.34 | 18 | 0.29 | 8 | 0.26 | 5 | 0.22 | Cyan. |
| 8 | C 25 | 700 | | 0.0015 | PS | 0.31 | 21 | 0.66 | 17 | 0.55 | 7 | 0.46 | 2 | 0.41 | Do. |
| 9 | C 100 | 700 | 25 | 0.003 | CAB | 0.10 | 14 | 1.15 | 8 | 0.59 | 4 | 0.25 | 5 | 0.30 | Blue. |
| 10 | A 100 | 700 | 25 | 0.0015 | PS | 0.06 | 18 | 1.55 | 12 | 1.25 | 9 | 1.27 | 12 | 0.66 | Do. |
| 11 | A 100 | 700 | (1) | 0.0015 | PS | 0.08 | 18 | 1.76 | 12 | 1.56 | 8 | 1.62 | 12 | 1.65 | Do. |
| 12 | A 100 | 700 | (2) | 0.0015 | PS | 0.12 | 21 | 1.76 | 21 | 1.60 | 21 | 1.49 | 20 | 1.20 | Do. |

¹ Rhodanine 25.
² 1-phenyl-5-mercaptotetrazole 25.

The tabulated data shows that while carbon tetrabromide and 2-mercaptobenzothiazole (MBT) are each effective as activators for the leucodihydroanthracene compound, the use of both mercaptobenzothiazole and carbon tetrabromide as activators for the leuco compounds of the class described was found to have two advantages as compared with their use separately in the absence of one another. First, the low sensitivity to short-duration high-intensity light exposures, characteristic of the use of mercaptobenzothiazole alone, is overcome by the addition of carbon tetrabromide to the composition without adversely affecting the high speed of the composition. Second, the high fog level, characteristic of the carbon tetrabromide activated composition, is greatly reduced by the addition of mercaptobenzothiazole to the formula, with the net result that a high concentration of the leuco compound may be used, resulting in high speed.

It is not intended that this application be limited except as may be required by the appended claims.

We claim:
1. A composition which prints out a visible image directly as a result of exposure to visible light said composition being an intimate mixture consisting essentially of
    (1) at least one colorless anthracene compound represented by the general formula

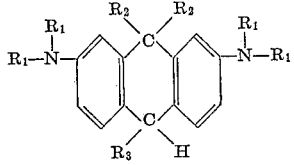

wherein each $R_1$ is a monovalent radical selected from the group consisting of —H, lower alkyl, aryl, and the several $R_1$'s may be the same or different and $R_2$ is a monovalent radical selected from the group consisting of H and alkyl and $R_3$ is a monovalent radical selected from the group consisting of aryl, substituted aryl, alkyl and H; and
    (2) at least one activator selected from the group consisting of (a) organic bromine compounds represented by the general formula A—C—Br₃ wherein A represents a monovalent radical selected from the group consisting of H, Cl, Br, alkyl, haloalkyl, aryl and aroyl and (b) colorless non-toxic sulfur containing organic compounds selected from the group consisting of
        1. mercapto compound represented by the general formula R–SH wherein R is a heterocyclic nucleus of the type commonly used in cyanine dye chemistry;
        2. disulfides represented by the formula R–S–S–R wherein R has the same meaning as in 1 above;
        3. disulfides of the general formula

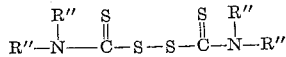

wherein R″ is selected from the group consisting of H, lower alkyl and aryl;
        4. sulfides wherein the sulfide is attached to a carbon atom in a heterocyclic ring wherein the same carbon atom is attached to two non-carbon atoms; and
        5. thiourea and substituted thioureas; and
        6. acrylic thioacetanilides said activator being present in said mixture in amounts ranging between 0.1 and 10 parts by weight for each part by weight of said anthracene compound.
2. The composition of claim 1 wherein the activator is CBr₄.
3. The composition of claim 1 wherein the activator is 2-mercaptobenzothiazole.
4. The composition of claim 1 wherein the activator is a mixture of CBr₄ and 2-mercaptobenzothiazole.
5. The composition of claim 1 wherein the anthracene compound is 2,7-bis(dimethylamino)-10-p-dimethylaminophenyl-9,10-dihydro-9,9-dimethylanthracene.
6. The composition of claim 1 containing in addition a binder for said constituents.
7. A dry film consisting of the composition of claim 1 dispersed in a thin layer on an inert support.
8. The film of claim 7 wherein the support is a film forming synthetic resin.
9. The process of producing a direct print-out image from originally colorless compounds which comprises preparing the composition of claim 1 in the form of a thin layer, exposing said layer to a pattern of visible light whereby a image prints out directly as a result of said exposure.
10. The process of claim 9 wherein the visible image is fixed by heating the layer containing the visible image.
11. The process of claim 9 wherein the visible image is fixed by washing the layer containing the visible image with a solvent for at least some of the constituents present in the photosensitive composition before exposure.

References Cited
UNITED STATES PATENTS
3,285,744  11/1966  Sprague et al. _____ 96—90

NORMAN G. TORCHIN, *Primary Examiner.*
C. E. DAVIS, *Assistant Examiner.*